US012712249B2

(12) United States Patent
Zhang et al.

(10) Patent No.: US 12,712,249 B2
(45) Date of Patent: Aug. 18, 2026

(54) APPARATUS AND METHOD FOR WIRELESS COMMUNICATION THROUGH WELL CASING ANNULUS

(71) Applicant: Baker Hughes Oilfield Operations LLC, Houston, TX (US)

(72) Inventors: Jun Zhang, Katy, TX (US); Kamalesh Chatterjee, Tomball, TX (US); Stewart Brazil, Edmond, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 45 days.

(21) Appl. No.: 18/760,707

(22) Filed: Jul. 1, 2024

(65) Prior Publication Data

US 2026/0005422 A1 Jan. 1, 2026

(51) Int. Cl.

| | |
|---|---|
| ***H01Q 1/04*** | (2006.01) |
| ***E21B 47/13*** | (2012.01) |
| ***H01Q 21/20*** | (2006.01) |

(52) U.S. Cl.

CPC ............... *H01Q 1/04* (2013.01); *E21B 47/13* (2020.05); *H01Q 21/20* (2013.01)

(58) Field of Classification Search

USPC .......................................................... 343/719

See application file for complete search history.

(56) References Cited

U.S. PATENT DOCUMENTS 5,455,573 A 10/1995 Delatorre
6,859,180 B1 * 2/2005 Rivera .................... H01Q 1/34 343/709
6,930,652 B2 * 8/2005 Smith ...................... G01V 3/28 343/895
7,098,858 B2 * 8/2006 Bittar ...................... H01Q 1/38 343/788
7,477,162 B2 * 1/2009 Clark ...................... E21B 47/01 340/854.6
7,916,092 B2 * 3/2011 Homan .................... H01Q 1/04 343/895
8,378,908 B2 * 2/2013 Wisler ................ H01Q 21/205 343/788
11,133,707 B2 * 9/2021 Almudallal .............. H01Q 1/38
2004/0183538 A1 9/2004 Hanstein et al.

(Continued)

FOREIGN PATENT DOCUMENTS

NO 337851 B1 * 7/2016 ............... G01V 3/28

OTHER PUBLICATIONS

International Search Report & Written Opinion for International Application No. PCT/US2025/035647; mailed Nov. 13, 2025, 8 pages.

*Primary Examiner* — Dimary S Lopez Cruz
*Assistant Examiner* — Brandon Sean Woods
(74) *Attorney, Agent, or Firm* — Baker Hughes Patent Organization

(57) ABSTRACT

An antenna assembly includes a first antenna fastened to a first member disposed in a second member, where the first member is spaced apart from the second member in a radial direction. The antenna assembly includes a second antenna fastened to the second member. A direction of an antenna moment associated with the first antenna or the second antenna intersects an axial direction of the first member, an axial direction of the second member, or both.

20 Claims, 9 Drawing Sheets

501-a

(56) References Cited

U.S. PATENT DOCUMENTS

| | | | | |
|---|---|---|---|---|
| 2006/0043973 | A1* | 3/2006 | Chen | H01Q 7/00<br>324/343 |
| 2008/0074336 | A1* | 3/2008 | Signorelli | H01Q 25/00<br>343/719 |
| 2008/0129622 | A1* | 6/2008 | Freeland | C09D 11/52<br>343/719 |
| 2016/0091628 | A1 | 3/2016 | Reagor et al. | |
| 2016/0258277 | A1 | 9/2016 | Bittar et al. | |
| 2018/0074221 | A1 | 3/2018 | Reiderman et al. | |

* cited by examiner

APPARATUS AND METHOD FOR WIRELESS COMMUNICATION THROUGH WELL CASING ANNULUS

BACKGROUND

During oil and gas production, well abandonment, or even resource recovery and sequestration, well monitoring may play a key role during various well operations. A well may include a number of coaxial pipes (e.g., production tubing, production casing) separated by various annular spaces, and a well monitoring system may include various gauges installed at different locations along the well for monitoring downhole conditions (e.g., pressure, temperature, flow conditions, or the like) in the various annular spaces.

Monitoring and management of the integrity of a well for containing pressure constitutes an ongoing concern of the petroleum industry. Techniques for improving system effectiveness associated with wireless power transmission and wireless communication associated with well monitoring operations are desired.

SUMMARY

Embodiments of the present disclosure are directed to an antenna assembly including: a first antenna fastened to a first member disposed in a second member, wherein the first member is spaced apart from the second member in a radial direction; and a second antenna fastened to the second member, wherein a direction of an antenna moment associated with the first antenna or the second antenna intersects an axial direction of the first member, an axial direction of the second member, or both.

In any one or combination of the embodiments disclosed herein, the first antenna extends partially around the first member, the second antenna extends partially around the second member, or a combination thereof.

In any one or combination of the embodiments disclosed herein, the first antenna, the second antenna, the first member, and the second member are concentric with the antenna assembly.

In any one or combination of the embodiments disclosed herein, at least one of: the first antenna includes one or more first antenna segments each partially wrapping around the first member; and the second antenna includes one or more second antenna segments each partially wrapping around the second member.

In any one or combination of the embodiments disclosed herein, at least one of: a direction of an antenna moments associated with the one or more first antenna segments intersects the axial direction of the first member, the axial direction of the second member, or both; and a direction of second antenna moments associated with the one or more second antenna segments intersects the axial direction of the first member, the axial direction of the second member, or both.

In any one or combination of the embodiments disclosed herein: the one or more first antenna segments at least partially overlap the one or more second antenna segments in a radial plane associated with the first member, the second member, or both.

In any one or combination of the embodiments disclosed herein, at least one of: a first radial angle of the one or more first antenna segments is less than or equal to 360 degrees; and a second radial angle of the one or more second antenna segments is less than or equal to 360 degrees.

In any one or combination of the embodiments disclosed herein, the one or more first antenna segments, the one or more second antenna segments, or both each include: at least two curved wiring elements, wherein each of the at least two curved wiring elements partially wraps around the first member; and at least two wiring elements extending in a first direction of the antenna assembly or a second direction intersecting the first direction, wherein each of the at least two wiring elements is coupled to the at least two curved wiring elements.

In any one or combination of the embodiments disclosed herein, the one or more first antenna segments, the one or more second antenna segments, or both each include at least one curved wiring element, wherein: the at least one curved wiring element of the one or more first antenna segments at least partially wraps around the first member; and the at least one curved wiring element of the one or more second antenna segments at least partially wraps around the second member.

In any one or combination of the embodiments disclosed herein, at least one of: each of the one or more first antenna segments includes a coil including one or more turns; and each of the one or more second antenna segments includes a coil including one or more turns.

In any one or combination of the embodiments disclosed herein, the one or more first antenna segments are of a different size compared to the one or more second antenna segments.

In any one or combination of the embodiments disclosed herein, at least one of: the one or more first antenna segments are encapsulated by one or more non-conductive materials, one or more conductive materials, or both; and the one or more second antenna segments are encapsulated by the one or more non-conductive materials, the one or more conductive materials, or both.

In any one or combination of the embodiments disclosed herein: the one or more first antenna segments are directly fastened or indirectly fastened to the first member; and the one or more second antenna segments are directly fastened to or indirectly fastened to the second member.

In any one or combination of the embodiments disclosed herein, at least one of: the first antenna includes a first antenna segment and a second antenna segment, wherein the first antenna segment at least partially overlaps the second antenna segment; and the second antenna includes a third antenna segment and a fourth antenna segment, wherein the third antenna segment at least partially overlaps the fourth antenna segment.

In any one or combination of the embodiments disclosed herein, at least one of: the first antenna includes a first antenna segment and a second antenna segment, wherein the first antenna segment is non-overlapping with the second antenna segment; and the second antenna includes a third antenna segment and a fourth antenna segment, wherein the third antenna segment is non-overlapping with the fourth antenna segment.

In any one or combination of the embodiments disclosed herein, at least one of: the first antenna includes a first antenna segment of a first radial angle and a second antenna segment of a second radial angle, wherein: the first radial angle is different from the second radial angle; or the first radial angle is equal to the second radial angle; and the second antenna includes a third antenna segment of a third radial angle and a fourth antenna segment of a fourth radial angle, wherein: the third radial angle is different from the fourth radial angle; or the third radial angle is equal to the fourth radial angle.

Embodiments of the present disclosure are directed to an antenna including: one or more antenna segments each partially wrapped around and releasably fastened to a member disposed in a borehole, wherein: a direction of an antenna moment associated with the one or more antenna segments intersects an axial direction of the member, and the member includes a tubular member or a tubular casing outside the tubular member.

In any one or combination of the embodiments disclosed herein, a radial angle of each of the one or more antenna segments is equal to or less than 360 degrees.

Embodiments of the present disclosure are directed to a communication system including: a first member disposed in a borehole; a second member disposed in the borehole, wherein the first member is disposed in the second member and is spaced apart from the second member in a radial direction; an antenna assembly including: a first antenna fastened to the first member; and a second antenna fastened to the second member, wherein: the first antenna or the second antenna is configured to generate an electromagnetic field associated with delivering power and providing communication between the first antenna and the second antenna, and a direction of an antenna moment associated with the first antenna or the second antenna intersects an axial direction of the first member, an axial direction of the second member, or both.

In any one or combination of the embodiments disclosed herein, the first antenna extends partially around the first member, the second antenna extends partially around the second member, or a combination thereof.

Further aspects supported by the present disclosure and features of example embodiments are illustrated in the accompanying drawings and/or described in the following description.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
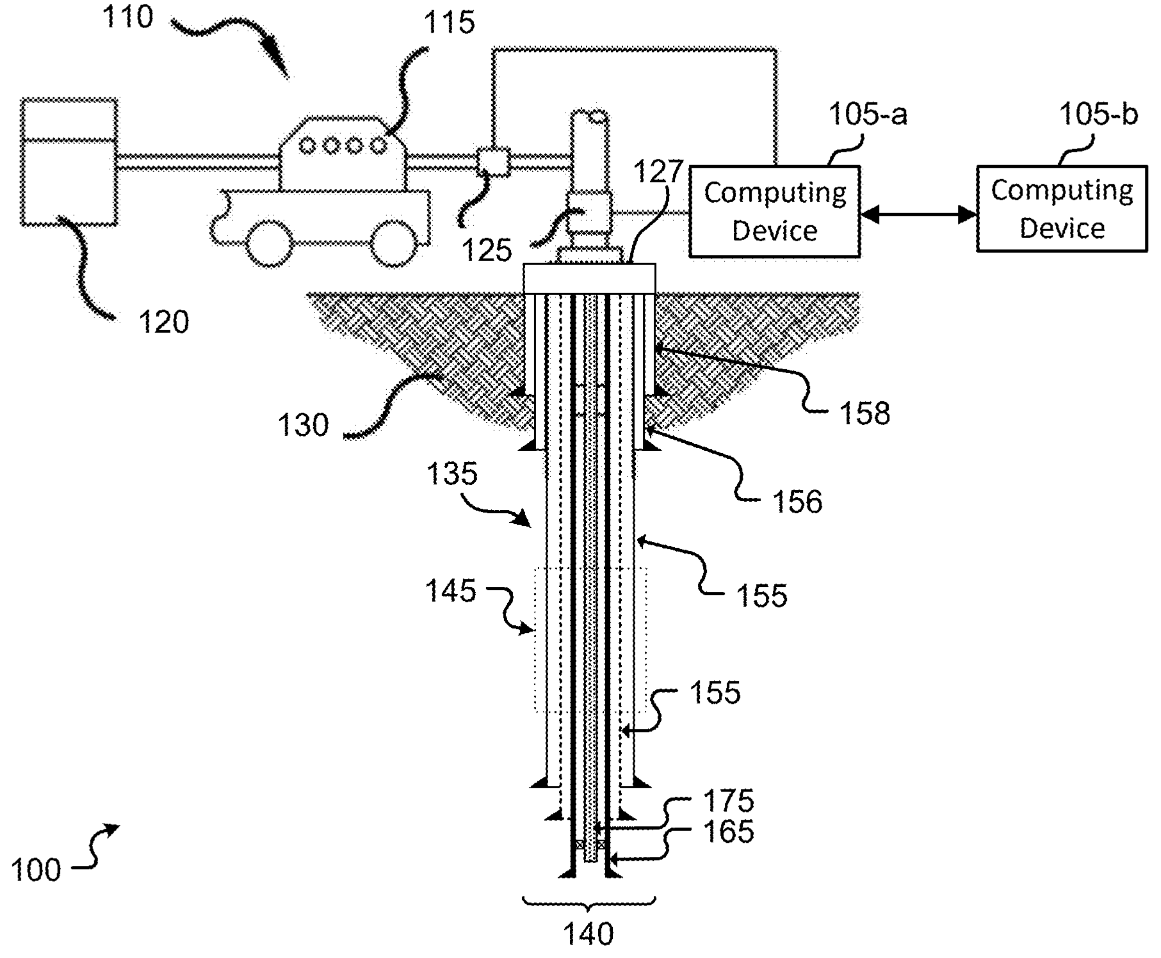
FIG. 1A is a diagram illustrating an example embodiment of a system in accordance with aspects of the present disclosure.

Permanent well monitoring may include measuring temperature and pressure behind the casing in subsea wells. For a well monitoring system, improved techniques for providing power and establishing communication for gauges installed for well integrity monitoring (e.g., gauges installed behind the casing (on the B-annulus) in a well).

Some approaches have implemented an induction coil system that can wirelessly provide power and real-time communication to gauges installed permanently in the B annulus. Such an induction coil system may support offshore operations since, in some cases, subsea well regulations prevent access to the B annulus unless the well is shut down. Such an induction coil system may support onshore operations. Embodiments of the present disclosure described herein may support offshore and onshore operations.

Some other approaches may utilize axial induction coils to establish power and communication through a layer of casing, in which the Tx coil is placed outside the production tubing and the Rx coil is placed outside the casing. However, for such approaches, the coupling efficiency between the Tx coil and the Rx coil is negatively impacted and may be very low due to the nature of the eddy current occurring on the casing circumferentially. In some cases, such approaches may be negatively impacted by associated server signal and power attenuation due to the eddy current. Additionally, for example, to tolerate the potential axial misalignment during the installation of the Tx coil and the Rx coil, such approaches may extend the length of the Rx coil, and the large redundancy portion of the extended Rx coil becomes the extra load and may further reduce system efficiency.

Some commercial/noncommercial systems utilize axial induction coils to establish power and communication through a layer of casing by placing the Tx coil outside the production tubing and the Rx coil outside the casing. However, in such approaches, the casing wall (even for cases in which one or more sections of the casing wall are formed of non-magnetic steel) presents major barrier to wireless power and communication due to the physics of eddy current. For example, the efficiency of systems implemented according to such approaches may be (in some cases) below 10% or dramatically less depending on the operating frequency, such as, for example, from a few hertz (Hz) to a few kilohertz (kHz).

In some cases, though utilizing a lower operating frequency may result in less energy wasted on the casing wall, and thus increased efficiency, the associated communication bandwidth is low and may limit the applications (e.g., data communications).

Though some approaches have attempted to place the Rx antenna (casing antenna) on the inner surface of the casing for increased efficiency with reduced attenuation, practical issues negatively impact the approaches. For example, some practical issues include wire for gauges penetrating the casing and affecting the integrity, a dependency on welding and/or mechanical design on the casing, and vulnerabilities of antennas to damages caused by drilling or completion. Techniques for improved induction coupling and more effectively providing power for the gauges are desired.

A detailed description of one or more embodiments of the disclosed apparatus and method are presented herein by way of exemplification and not limitation with reference to the Figures.

According to one or more embodiments of the present disclosure, an antenna assembly including radial directional coils is described that support improved system efficiency in wireless power and communication applications. The radial direction coils described herein support improved wireless power transmission and wireless communication to downhole electronic equipment through a well casing annulus and the well casing. Example aspects of the antenna assembly are described herein with reference to the following figures.

FIG. 1A is a diagram illustrating an example embodiment of a system 100 in accordance with aspects of the present disclosure.

The system 100 is configured to perform any suitable energy industry operation, such as, for example, a drilling operation, a measurement operation and/or a production operation. However, example aspects supported by the system 100 as described herein are not limited to energy industry operations and an associated downhole environment.

The system 100 includes a borehole 135 in a subsurface formation 130. A borehole string 140 (also referred to herein as a completion string) is disposed in the borehole 135 that penetrates the formation 130. The borehole 135 may be an open hole, a cased hole or a partially cased hole. That is, for example, the borehole 135 may be a borehole (inside the formation 130) or a cased hole (e.g., inside an intermediate casing described herein). In one embodiment, the borehole string 140 is a production string including a production tubing 175 (tubing member) that extends from a wellhead at a surface location (e.g., at a drill site or offshore vessel). The borehole string 140 may be a production string including additional components such as, for example, a surface-controlled subsurface safety valve, gas lift mandrels, landing nipples, and packer or packer seal assemblies. In some embodiments, the borehole string 140 (production string) may be run inside another surface or conductor casing.

The production tubing 175 may be, for example, production tubing through which production fluids (e.g., oil, gas, water, and the like) are produced and transferred to surface equipment 110.

In some embodiments, power supply and communications may be provided through a tubular electric cable (not illustrated) attached to equipment on the production tubing 175 and a feedthrough (not illustrated) at the surface.

The borehole string 140 may include an intermediate casing 155. In an example implementation, the borehole string 140 is absent the intermediate casing 155, example aspects of which are later described herein. In another example implementation, the borehole string 140 includes the intermediate casing 155, example aspects of which are later described herein.

For implementations including the intermediate casing 155, the intermediate casing 155 may be, for example, a wellbore casing that lines the inside of the borehole 135 to support the well (e.g., prevent collapse of the well) and isolate contents of the well from the surrounding rock and soil. The intermediate casing 155 may be referred to herein as an intermediate well casing, a wellbore casing, an outer casing, or a B casing. The borehole string 140 may further include a production casing 165. The production casing 165 may also be referred to herein as an inner casing or an A casing.

The borehole string 140 may include more than one intermediate casing 155, non-limiting examples of which are described herein. In an example, the borehole string 140 may include a surface casing 156 to prevent ground water from penetrating into the well. In another example, the borehole string 140 may include a conductor casing 158 which is relatively shallow. For example, the conductor casing 158 may extend down from the upper surface of the formation 130 down to about 100 feet. Illustrated distances between ends of the casings and tubing members (e.g., surface casing 156, conductor casing 158, intermediate casing 155, production casing 165, production tubing 175) and the upper surface of the formation 130 are examples, and embodiments of the present disclosure are not limited thereto.

The space between the production tubing 175 and the production casing 165 may be referred to as an annulus 167 (also referred to herein as 'A annulus'). The space outside the production casing 165 and within or without the intermediate casing 155 may be referred to as an annulus 157 (also referred to herein as 'B annulus') ('C annulus', or other outer annular space, for example, are depending on well configuration). The borehole string 140 may include a power and communication cable in the annulus 167 (A annulus) which may power and commute to the Tx coil outside the production tubing 175.

A computing device 105 (e.g., computing device 105-*a*) may be disposed in operable communication with components such as sensors 125 located above the surface, the pump 115, and/or downhole components. For example, the computing device 105 may be in operable communication with sensors (e.g., pressure sensors, temperature sensors, vibration sensors, gas sensors, and the like) located below the surface and/or in the borehole string 140. In some examples, the computing device 105-*a* may be in operable communication with a tool (or multiple tools).

The system 100 supports communication between the computing device 105 and other devices of the system 100 via wired communication protocols, wireless communication protocols (e.g., electromagnetic (EM) signals, WiFi, Bluetooth™, ZigBee™, Ubiquiti™, 3G, 4G, LTE, and the like), and/or combinations including one or more of the foregoing.

The system 100 supports telemetry techniques capable of transmitting data from components located downhole to the surface and/or surface equipment 110. Non-limiting examples of the telemetry techniques include wire telemetry, acoustic telemetry or mud pulse (MP) telemetry supportive of transmitting information by generating vibrations in fluid in the borehole 135, electromagnetic (EM) telemetry supportive of transmitting information by way of signals that propagate at least in part through the earth (e.g., through formations 130). Other non-limiting examples of telemetry techniques supported by aspects of the present disclosure include the use of hardwired drill pipe, fibre optic cable, or drill collar acoustic telemetry to carry data to the surface and/or surface equipment 110.

The system 100 may include one or more access nodes (not illustrated) supportive of communicating data along the borehole string 140 (e.g., up or down the borehole string 140). In one or more embodiments, the access nodes may be implemented in the borehole 135 or a communication borehole (not illustrated) separate from the borehole 135. In some examples, the one or more access nodes may provide functionality as wireless access nodes for relaying data from a tool to the surface (e.g., to a computing device 105).

In one or more embodiments, the system 100 may include a chain of access nodes spaced apart along the borehole string 140, and the chain of access nodes may support repeating of data in a unidirectional (e.g. downhole to surface or surface to downhole) or bidirectional manner. For example, an access node (or chain of access nodes) may support the communication of data between a computing device 105, a tool, and the like.

Accordingly, for example, the communication protocols and telemetry techniques supported by the system 100 enable communication between computing devices 105 (e.g., computing device 105-*a*, computing device 105-*b*, and the like) and downhole components.

The computing device 105 is configured to receive, store and/or transmit data generated from components included in the surface equipment 110 and/or downhole components (e.g., a tool, downhole sensors, and the like). The computing device 105 includes processing components configured to analyze received data (e.g., data received from the pump 115, fluid tank 120, sensors 125, a tool, and the like). The computing device 105 includes processing components configured to provide data (and/or control signals to other components of the system 100. The computing device 105 includes any number of suitable components, such as processors, memory, communication devices and power sources.

In the descriptions herein, example embodiments of an antenna assembly 160 are described with reference to a casing assembly (also referred to herein as a tubular assembly) that is arranged concentrically or in a "nested" fashion. The terms "liner" and "casing" may be used interchangeably throughout to generally designate a tubular structure (e.g., a hollow cylindrical structure) for providing isolation, strength, stability, and protection for a section of a wellbore. These terms are not intended to identify any particular type or class of wellbore tubulars or specify any particular dimensions, wall thicknesses, materials or other such characteristics. Moreover, while tubulars may generally have a circular cross-section, other cross-sectional shapes (e.g., ovoid) may be utilized. It should be understood that the examples described herein may be implemented for "nested" arrangements and other arrangements (e.g., serially aligned) as suitable for certain applications.

Example aspects of the borehole string 140 described herein relate to sensors (connected to a RX antenna) outside the production casing 165 not necessarily below the intermediate casing 155. Example aspects of the borehole string 140 described herein relate to a TX antenna coupled to an outside surface or part of the production tubing 175.

Figure 1B:
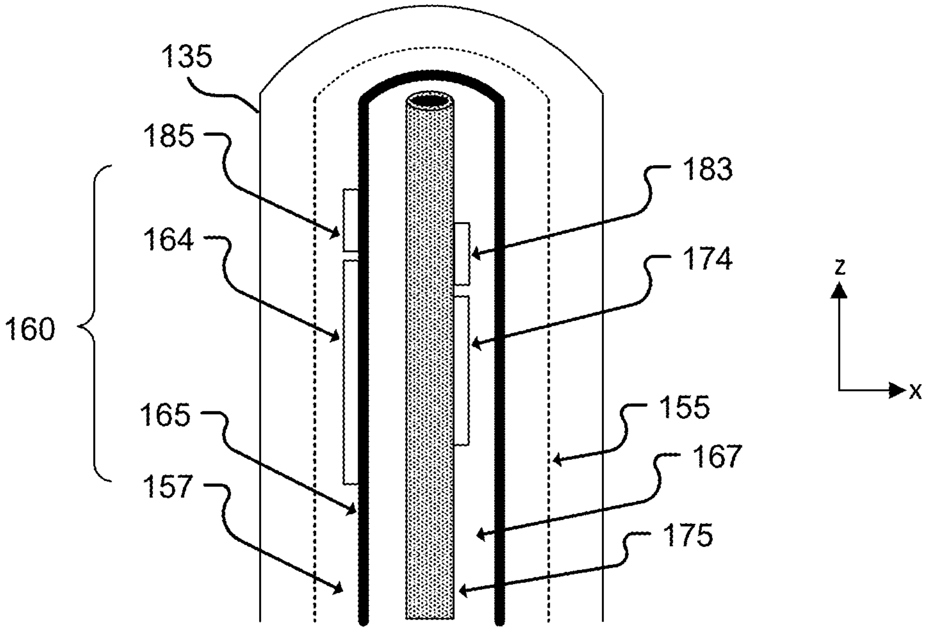
FIG. 1B illustrates an example of an antenna assembly in accordance with aspects of the present disclosure.

FIG. 1B illustrates a partial view of an area 145 including the borehole 135 and borehole string 140, illustrating an example of an antenna assembly 160 supported by aspects of the present disclosure. The antenna assembly 160 may support wireless power transfer and wireless communications in accordance with example aspects of the present disclosure.

The antenna assembly 160 may include an antenna 174 coupled to production tubing 175. The antenna 174 may support wireless power transfer and wireless communication. The antenna 174 may be, for example, a radial directional antenna. In accordance with one or more embodiments of the present disclosure, the antenna 174 may include one or more antenna segments (e.g., antenna segments 210 later described with reference to FIGS. 2A and 2B) coupled to the production tubing 175. Example aspects of the antenna 174 are later described herein.

A monitoring gauge 183 may be provided and may be coupled to the production tubing 175. A monitoring gauge 185 may be provided and may be coupled to the production casing 165. In some aspects, each of the monitoring gauge 183 and the monitoring gauge 185 may be included or integrated in a wired or wireless sensor module supportive of monitoring one or more parameters (e.g., pressure, temperature, or the like) associated with an annulus, the wellbore, or the formation 130 as described herein based on implementation of the borehole string 140. In some aspects, the monitoring gauge 183 and the monitoring gauge 185 may be implemented for permanent monitoring of one or more parameters. In some aspects, each of the monitoring gauge 183 and the monitoring gauge 185 may be implemented as part of a sensor package including multiple gauges.

Sensor modules (e.g., including one or more monitoring gauges 183, including one or more monitoring gauges 185) may be positioned underneath the wellhead structure associated with the borehole string 140. The monitoring gauge 183, for example, may be configured to read parameters of the annulus 167. The monitoring gauge 185, for example, may be configured to read parameters for the wellbore or the formation 130. In some other cases, the monitoring gauge 185, for example, may be configured to read parameters for an annulus (e.g., annulus 157) between the production casing 165 and the intermediate casing 155.

In some embodiments, in which there are monitoring gauges 183 in the annulus 167 (e.g., outside the production tubing 175), the monitoring gauges 183 may be connected directly through a completion gauge power and bus (not illustrated) to surface equipment 110. Additionally, or alternatively, the monitoring gauge 183 may be electrically coupled (not illustrated) to the antenna 174. For example, the monitoring gauge 183 may be electrically coupled to the antenna 174 and then to the completion electronics bus. In some aspects, the monitoring gauge 183 may provide data measurements (e.g., pressure measurements) associated with annulus 167.

In some aspects, the antenna 174 may wirelessly provide power to antenna 164, and antenna 164 may provide all or a portion of the received power to the monitoring gauge 185 in association with powering the monitoring gauge 185. The monitoring gauge 185 may provide measurement data to the antenna 164, the antenna 164 may provide data signals representative of the measurement data to the antenna 174, and the antenna 174 (which is on the completion bus) may provide the data signals to the surface (e.g., to surface equipment 110).

In an example implementation, the borehole string 140 is absent the intermediate casing 155, and the measurement data is associated with the wellbore or the formation 130. For example, the monitoring gauge 185 may be configured for monitoring properties associated with the wellbore or the formation 130.

In another example implementation, the borehole string 140 includes the intermediate casing 155, and the measurement data is associated with the annulus 157 between the casing 165 and the intermediate casing 155. For example, the monitoring gauge 185 may be configured for monitoring properties associated with the annulus 157.

The antenna assembly 160 may include an antenna 164 of a second type, coupled to the production casing 165. The antenna 164 may be, for example, a radial directional antenna. The antenna 164 may support wireless reception of data signals and wireless transmission of data signals. Additionally, or alternatively, the antenna 164 may support wirelessly receiving and transmitting signals associated with wireless power transfer. In accordance with one or more embodiments of the present disclosure, the antenna 164 may include one or more antenna segments (e.g., antenna segments 210 later described with reference to FIGS. 2A and 2B) coupled to the production casing 165. Example aspects of the antenna 164 are later described herein.

The antenna assembly 160 may include a monitoring gauge 185 coupled to the production casing 165. In some aspects, the monitoring gauge 185 may be electrically (wired or wirelessly) coupled (not illustrated) to the antenna 164. The antenna 164 and may support wireless power transfer and wireless communication to antenna 174 and monitoring gauge 183 as described herein.

Aspects of the present disclosure support optimizing or tuning the operation frequency of the antenna assembly 160 for wirelessly receiving and transmitting data signals and/or for wireless power transfer. In some embodiments, the operating frequency of the antenna assembly 160 may be in a range from 5 Hz to 100 kHz and support behind-casing monitoring (e.g., for monitoring annulus 157). The antenna assembly 160 may support resonant coupling techniques for further optimizing efficiency associated with wirelessly receiving and transmitting data signals and wireless power transfer. As will be described herein, the physical antenna design and arrangement implemented at the antenna assembly 160 may increase the system efficiency.

In an example, the central axis (e.g., z-axis) of the antenna assembly 160 may correspond to or be at least substantially parallel to a central axis of the borehole string 140. In some other examples, the central axis (e.g., z-axis) of the antenna assembly 160 may be offset (e.g., in a radial direction, for example, in an x-axis or y-axis direction) from the central axis of the borehole string 140. In some aspects, the central axis (e.g., z-axis) of the antenna assembly 160 may be parallel or may intersect the central axis of the borehole string 140.

In some embodiments, the antenna 164 is configured to generate an electromagnetic field associated with delivering power and providing communication between the antenna 164 and antenna 174. In some aspects, the antenna 164 may generate the electromagnetic field based on signals provided by control circuitry (not illustrated) coupled to the antenna 164.

In some embodiments, the antenna 174 is configured to generate an electromagnetic field associated with delivering power and providing communication between the antenna 164 and antenna 174. In some aspects, the antenna 174 may generate the electromagnetic field based on signals provided by control circuitry (not illustrated) coupled to the antenna 174.

Example aspects of the antenna assembly 160, antenna 174, and antenna 164 in accordance with one or more embodiments of the present disclosure are described herein with reference to the following figures. Aspects of the present disclosure support implementations of any quantity of antennas 164 or antennas 174, at any suitable location along the borehole string 140 supportive of the features described herein.

Figure 2A:
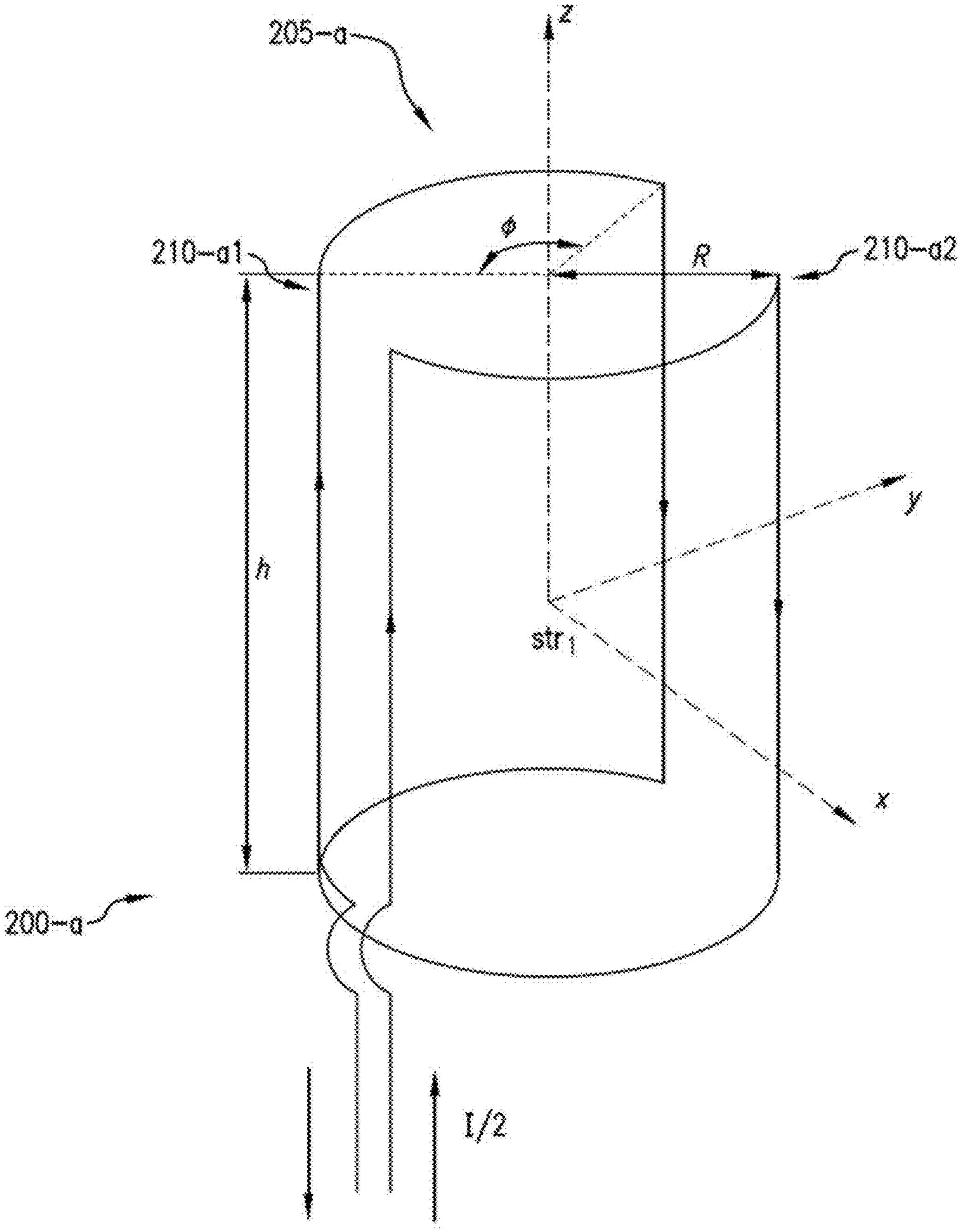
FIGS. 2A and 2B are diagrams illustrating the fundamental saddle coil antenna configuration in accordance with one or more embodiments of the present disclosure.
Figure 2B:
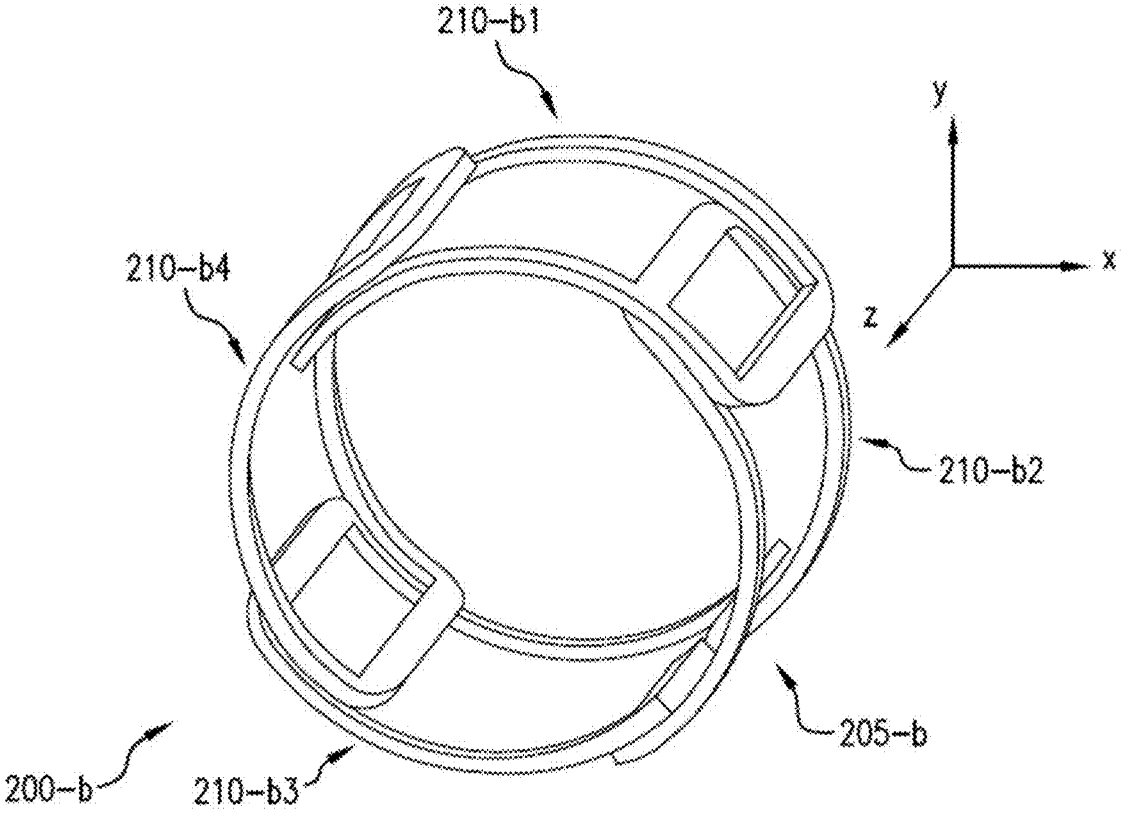

FIGS. 2A and 2B are diagrams illustrating antenna assemblies 200 (e.g., antenna assembly 200-*a*, antenna assembly 200-*b*) and included antennas 205 (e.g., antenna 205-*a*, antenna 205-*b*) in accordance with one or more embodiments of the present disclosure.

Aspects of the antenna assemblies 200 (and included antennas 205) may be implemented, for example, at antenna assembly 160 of FIG. 1B. For example, aspects of the antennas 205 described herein may be implemented at antenna 174 and/or at antenna 164 of the antenna assembly 160. Aspects of the antennas 205 described herein may be implemented at antenna 174 and production tubing 175 and/or may be implemented at antenna 164 and production casing 165.

With reference to FIG. 2A, an antenna assembly 200-*a* is illustrated in which an antenna 205-*a* includes an antenna segment 210-*a*1 and an antenna segment 210-*a*2. Each antenna segment 210 (e.g., antenna segment 210-*a*1, antenna segment 210-*a*2) may have an arced member (also referred to herein as a curved element, a curved wiring element, or arced wiring element) defined by a radius R and a radial angle Φ. According to one or more embodiments of the present disclosure, the radial angle Φ may be less than 360 degrees. For example, the radial angle Φ may range from about 90 degrees to about 180 degrees, but is not limited thereto. In the example of FIG. 2A, the antenna 205-*a* may be a saddle coil having a height h in the z direction.

In some embodiments, the antenna segments 210 may be identical. For example, the antenna segments 210 may have the same measurements (e.g., arc lengths, heights h, radial angles Φ), such that antenna segment 210-*a*1 and antenna segment 210-*a*2 provide the same amount of coverage (e.g., physical overlap) when coupled to a common structure (e.g., production casing 165 or production tubing 175 described with reference to FIGS. 1A and 1B).

In some other embodiments, the antenna segments 210 may have different measurements (e.g., any of arc length, height, radial angle Φ). In an example, the radial angle Φ associated with antenna segment 210-*a*1 may be different from the radial angle Φ associated with antenna segment 210-*a*2, such that antenna segment 210-*a*1 and antenna segment 210-*a*2 provide different amounts of coverage (e.g., physical overlap) when coupled to a common structure (e.g., production casing 165 or production tubing 175 described with reference to FIGS. 1A and 1B).

In an example implementation (not illustrated), each of antenna segment 210-*a*1 and antenna segment 210-*a*2 may provide a same coverage amount (e.g., 180 degrees) with respect to the common structure. In another example implementation (not illustrated), antenna segment 210-*a*1 and antenna segment 210-*a*2 may provide different respective coverage amounts with respect to the common structure. For example, (not illustrated), antenna segment 210-*a*1 may provide a first coverage amount (e.g., 180 degrees) with respect to the common structure, and antenna segment 210-*a*1 may provide a second coverage amount (e.g., 90 degrees) with respect to the common structure.

Although the example illustrated at FIG. 2A illustrates two antenna segments 210, embodiments of the present disclosure are not limited thereto. For example, the antenna 205-*a* may include any quantity of antenna segments 210 (e.g., a single antenna segment 210 or multiple antenna segments 210).

In some aspects, as illustrated with reference to FIG. 2A, the antenna segment 210-*a*1 and the antenna segment 210-*a*2 are physically coupled together, but embodiments supported by the present disclosure are not limited thereto. The example illustrated at FIG. 2A further illustrates a current (e.g., an AC current, a DC current), which when applied to the antenna assembly 200-*a*, flows through the antenna segment 210-*a*1 and antenna segment 210-*a*2. In another example, the antenna segment 210-*a*1 and antenna segment 210-*a*2 may be wired individually with their own current directions.

The antennas 205 (e.g., antenna 205-*a*, antenna 205-*b*, and the like) described herein may be formed of one or more materials suitable for operation of the antennas 205 as described herein. In some embodiments, the body of antennas 205 may be formed of any non-conductive material, such, for example, fiber-glass, rubber, resin, plastic, or the like. In some examples, one or more antenna segments 210 may be a wire form antenna or a printed circuit antenna. For example, one or more wires of antenna segments 210 may be a wire form or a printed circuit form.

With reference to FIG. 2B, an antenna assembly 200-*b* is illustrated in which an antenna 205-*b* includes an antenna segment 210-*b*1, an antenna segment 210-*b*2, an antenna segment 210-*b*3, and an antenna segment 210-*b*4. The antenna segments 210-*b* (e.g., antenna segment 210-*b*1, antenna segment 210-*b*2, antenna segment 210-*b*3, and antenna segment 210-*b*4) are formed such that each antenna segment 210-*b* partially wraps around a portion of a member 215-*b*. With reference to FIG. 2B, the antenna segments can overlap each other with variable portions. In the non-limiting example illustrated at FIG. 2B, each antenna segment 210-*b* includes a single turn, and each antenna segment 210-*b* (e.g., antenna segment 210-*b*1) overlaps at least two other antenna segments 210-*b* (e.g., antenna segment 210-*b*2 and antenna segment 210-*b*4).

Figure 3A:
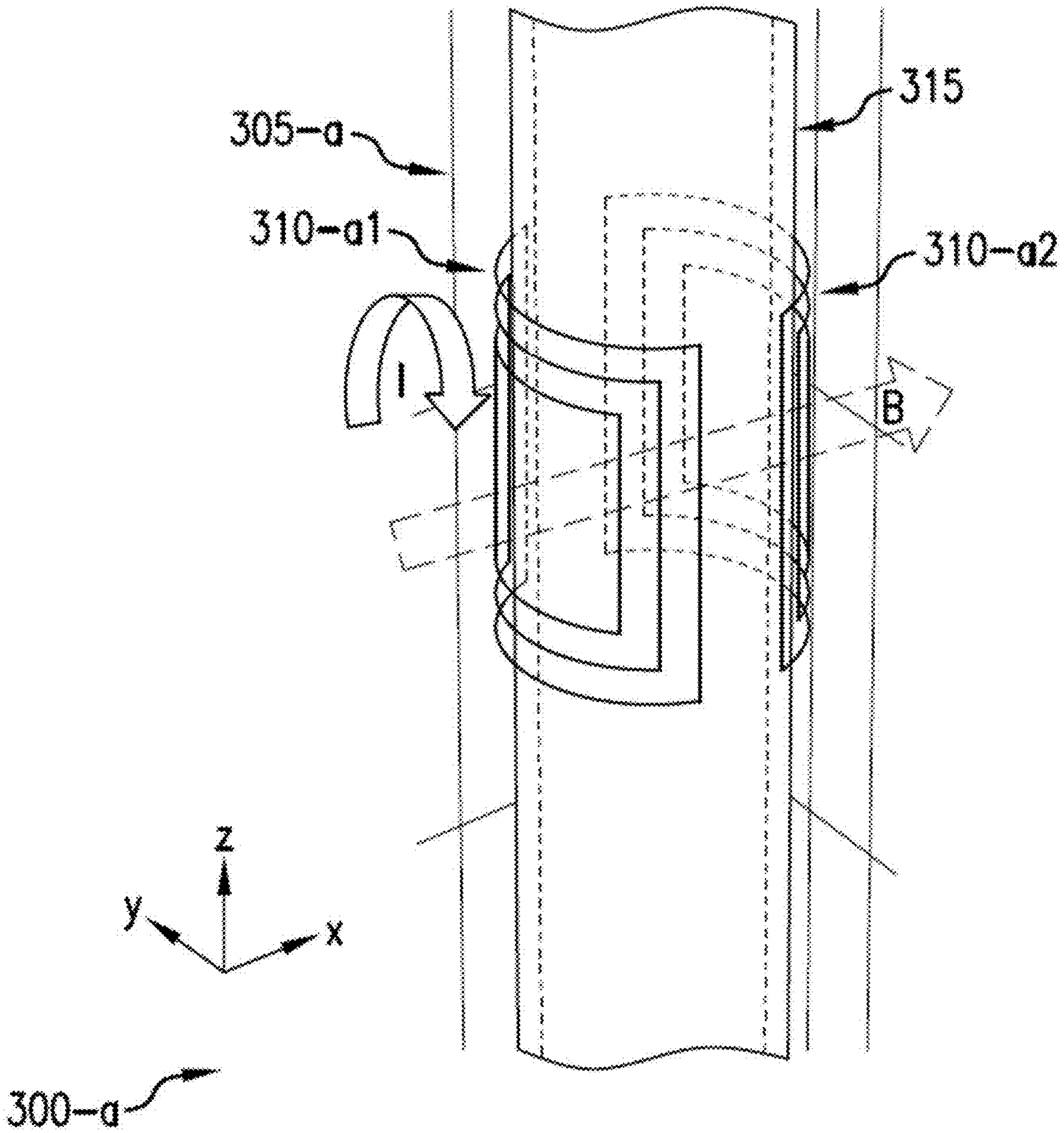
FIGS. 3A and 3B are diagrams illustrating an example tubing or inner antenna configuration in accordance with one or more embodiments of the present disclosure.
Figure 3B:
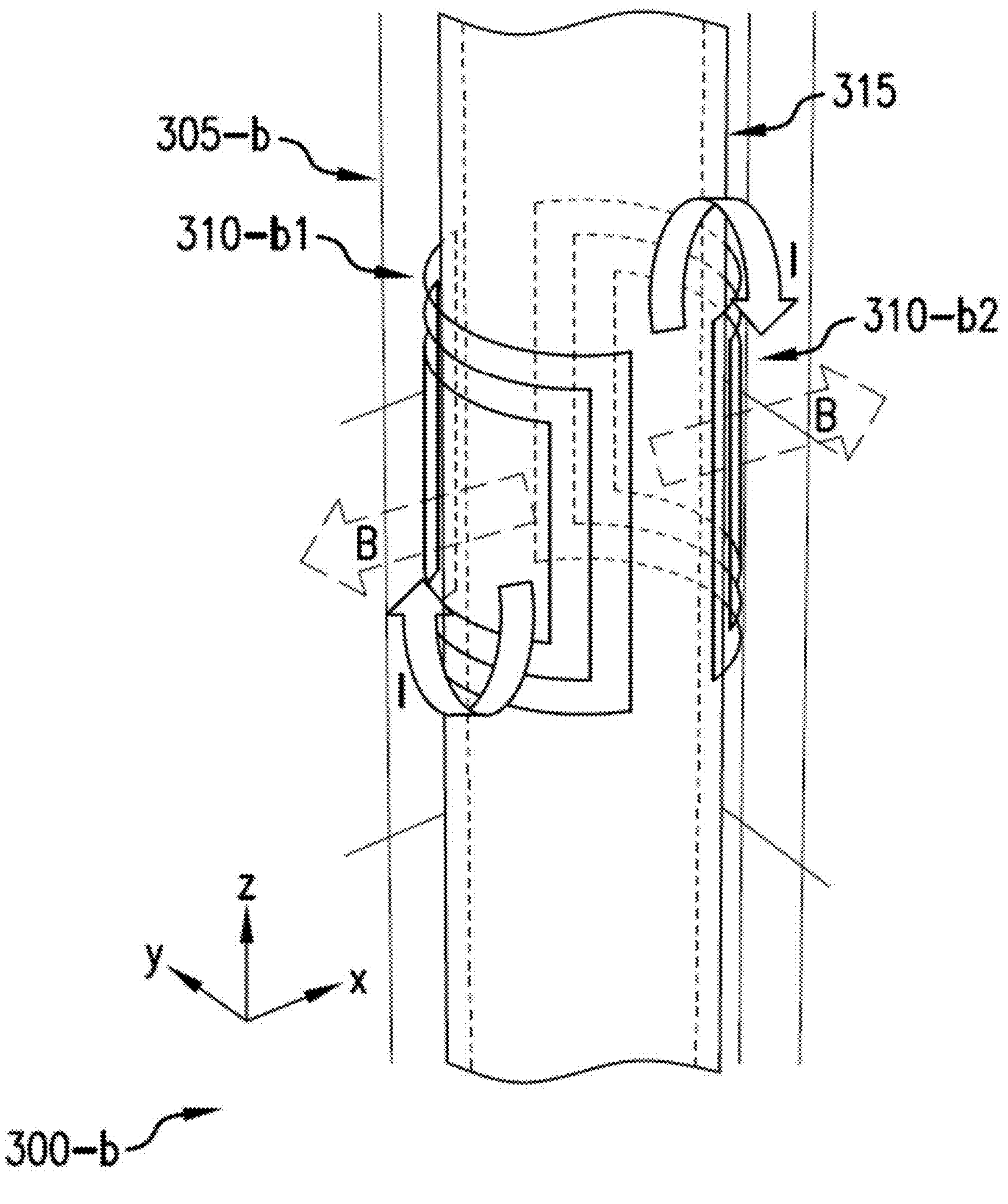

Aspects of the present disclosure support a single or multiple turns of wiring for each antenna segment 210. For example, with reference to FIG. 2A, each of antenna segment 210-*a*1 and antenna segment 210-*a*2 includes a single turn. With reference to FIG. 2B, each of antenna segment 210-*b*1 through antenna segment 210-*b*5 includes a multi-turn turn bundle. With reference to FIGS. 3A and 3B later described herein, each of antenna segment 310-*a*1 and antenna segment 310-*a*2 includes multiple turns. Aspects of the present disclosure are not limited thereto, and the antenna segments 210 described herein may include any quantity of turns supportive of wireless power transfer and/or data transmission.

Accordingly, for example, for implementations described herein in which an antenna 205 includes multiple antenna segments 210, each antenna segment 210 may overlap at least one other antenna segment 210 (e.g., as illustrated at FIG. 2B), or the antenna segments 210 may be non-overlapping (e.g., as illustrated at FIG. 2A).

In some cases, overlapping multiple antenna segments 210 of an antenna 205 in accordance with one or more embodiments of the present disclosure may support increasing reception coverage supported by the antenna 205, for cases in which the antenna 205 is associated with a receiver circuit.

FIGS. 3A and 3B are diagrams illustrating an antenna assembly 300-*a* and an antenna assembly 300-*b* in accordance with one or more embodiments of the present disclosure. Aspects of the antenna assemblies 300 (and included antennas 305) may include aspects of an antenna assembly (e.g., antenna assembly 160, antenna assemblies 200) described herein, and repeated descriptions of like elements are omitted for brevity.

FIGS. 3A and 3B illustrate example aspects of an antenna 305 (e.g., antenna 305-*a*, antenna 305-*b*) and one or more antenna segments 310 of the antenna 305 wrapped on a member 315 (e.g., tubular member) and orientation of the associated antenna moment (indicated by B in FIG. 3B)/directional magnetic field based on the direction of an applied current I. In some aspects, each antenna segment 310 may generate a respective antenna moment/directional magnetic field based on an applied current flowing through the antenna segment 310. The term antenna moment may refer to the direction of an electromagnetic field generated by the antenna segment 310. In some aspects, the antenna moment/directional magnetic field of a given antenna segment 310 may intersect an axial direction (e.g., Z-direction) of the member 315.

In the example embodiments illustrated at FIGS. 3A and 3B, antenna assembly 300-*a* and antenna assembly 300-*b* may be configured in association with transmitting signals. Aspects of antenna 305-*a* (and antenna segment 310-*a*1 and antenna segment 310-*a*2) and member 315 described with reference to FIG. 3A may be applied to antenna 174 and production tubing 175 described with reference to FIGS. 1A and 1B. Additionally, or alternatively, aspects of antenna 305-*b* (and antenna segment 310-*b*1 and antenna segment 310-*b*2) and member 315 described with reference to FIG. 3B may be applied to antenna 174 and production tubing 175 described with reference to FIGS. 1A and 1B.

In an example embodiment described with reference to FIG. 3A, antenna 305-*a* is a two-segment, multi-turn, saddle coil placed over member 315. In the example of FIG. 3A, antenna 305-*a* includes antenna segment 310-*a*1 and antenna segment 310-*a*2, and each of antenna segment 310-*a*1 and antenna segment 310-*a*2 includes three turns. However, aspects of the present disclosure are not limited thereto, and the antenna segments 310 described herein may include any quantity of turns (e.g., tens or more, hundreds or more, and the like) supportive of target characteristics for an associated antenna 305. In the example, member 315 is a production tubing having a diameter of 5.5".

In some aspects, the antenna assembly 300-*a* may include a gap (not illustrated) between each antenna segment 310 (e.g., antenna segment 310-*a*1, antenna segment 310-*a*2) and member 315. In some embodiments, member 315 may be a portion of a production tubing, a raised section of the production tubing, or a recessed section of the production tubing. In an example, the antenna assembly 300-*a* may include a non-conductive material disposed between each antenna segment 310 and the member 315, which may improve the antenna moment of the antenna 305-*a*. In some embodiments, each antenna segment 310 (or a portion of each antenna segment 310) may be coated with a non-conductive material or may be included in a housing formed of the non-conductive material, such that the non-conductive material provides the gap described herein. Accordingly, for example, for instances in which the housing (e.g., formed of a non-conductive material or a conductive material) is implemented, the antenna segment 310 may be indirectly coupled (e.g., via the housing) to the member 315. An example of a housing formed of the non-conductive material is later described with reference to FIGS. 5A through 5C.

In an example embodiment, each antenna segment 310 may be 8" long in the axial direction (e.g., z-direction in FIG. 3A) of the antenna assembly 300-*a*. However, aspects of the present disclosure are not limited thereto, and aspects of the present disclosure support setting a length for each antenna segment 310 that supports effective wireless data transmissions and/or wireless power transfer.

In an example embodiment, an antenna segment 310 (e.g., antenna segment 310-*a*1, antenna segment 310-*b*1, or the like) may partially wrap around the member 315, such that a radial angle of the antenna segment 310 is less than 360 degrees. Additionally, or alternatively, (not illustrated), an antenna segment 310 (e.g., antenna segment 310-*a*1, antenna segment 310-*b*1, or the like) may completely wrap around the member 315, such that a radial angle of the antenna segment 310 is equal to 360 degrees. Aspects of the partial wrapping and/or complete wrapping of a member may be similarly applied to other antenna segments described herein.

In an example described with reference to FIG. 3A, in response to applying a current I (e.g., a DC current, an AC current) to antenna 305-*a* such that the current I flows on both sides of the antenna 305-*a* in the same direction (e.g., such that the current I flows through antenna segment 310-*a*1 and antenna segment 310-*a*2 in the same direction), the flow of the current I creates a mono-directional magnetic field illustrated by arrow B. In the example, the mono-directional magnetic field is perpendicular to the axial direction of the antenna assembly 300-*a*. In the descriptions herein, the antenna axis of a given antenna assembly (e.g., antenna 305-*a*, antenna 305-*b* later described herein, antenna 405-*a* later described herein, antenna 405-*b* later described herein, antenna 505 later described herein, and the like) may be defined by the field axis of the antenna.

In an alternative or additional example described with reference to FIG. 3B, in response to applying a current I (e.g., a DC current, an AC current) to antenna 305-*b* such that the current I flows on sides of the antenna 305-*b* in different directions (e.g., such that the current I flows through antenna segment 310-*b*1 in a first direction and flows through antenna segment 310-*a*2 in a second direction opposite the first direction), the flow of the current I creates a bi-directional magnetic field illustrated by arrows B. Expressed another way, the magnetic fields from opposite antenna segments 310 (e.g., antenna segment 310-*b*1 and antenna segment 310-*b*2) may be in different directions for cases in which the directions in which the current I flows through the antenna segments 310 are not aligned.

In some aspects, the mono-directional magnetic field described with reference to FIG. 3A may provide a potential higher efficiency since no fields are against each other in the near region, but embodiments of the present disclosure are not limited thereto. For example, aspects of the present disclosure may include optimizing the associated receiver and receiver circuit in association with reducing the impact of the magnetic field pattern on the overall effectiveness of the antennas 305.

Figure 4:
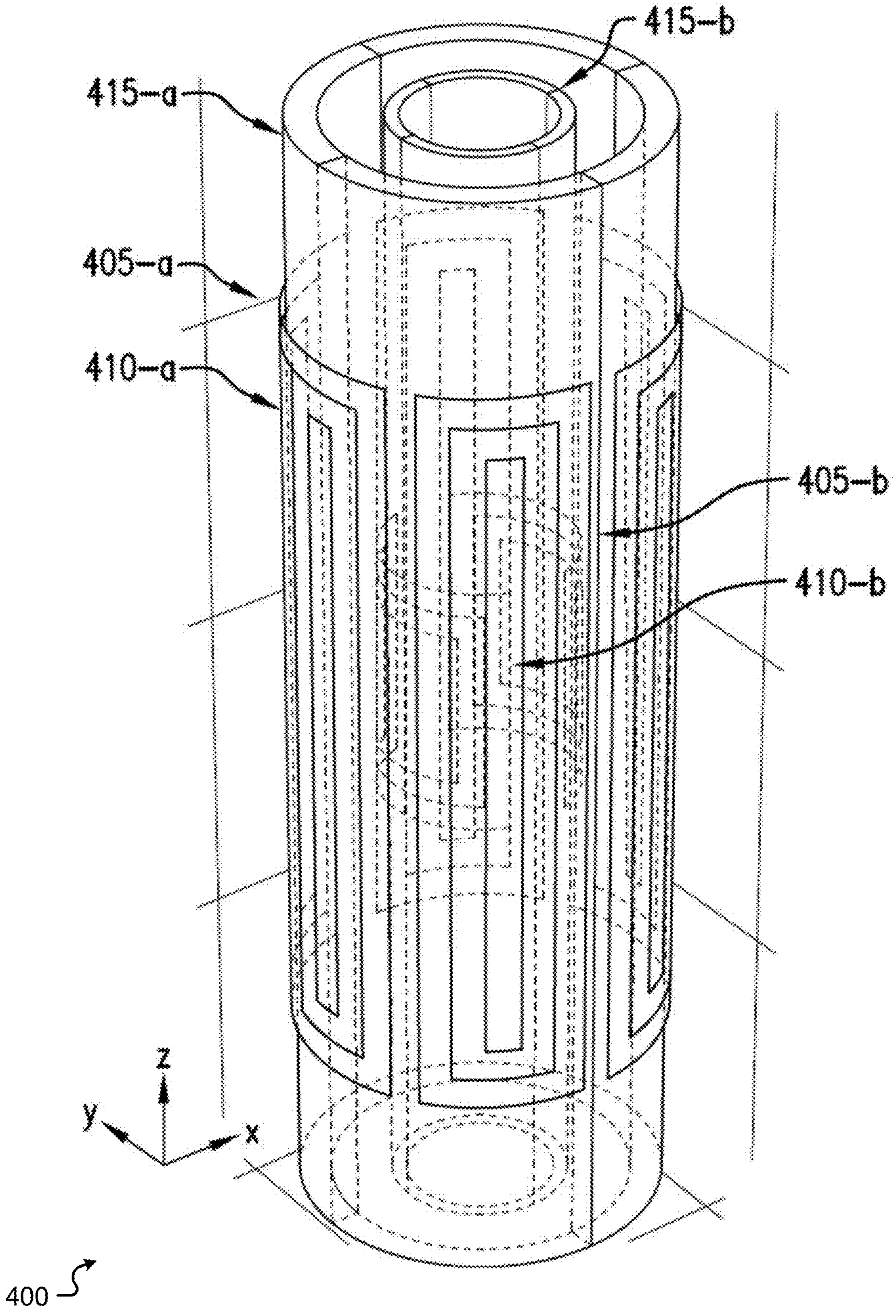
FIG. 4 is a diagram illustrating an example casing or outer antenna configuration in accordance with one or more embodiments of the present disclosure.

FIG. 4 is a diagram illustrating an antenna assembly 400 in accordance with one or more embodiments of the present disclosure. Aspects of the antenna assembly 400 (and included antennas 405) may include aspects of an antenna assembly (e.g., antenna assembly 160, antenna assemblies 200, antenna assemblies 300) described herein, and repeated descriptions of like elements are omitted for brevity.

In the example embodiment illustrated at FIG. 4, antenna assembly 400 may be configured for transmitting and receiving signals.

Aspects of antenna 405-*a* (and antenna segments 410-*a*) and member 415-*a* described with reference to FIG. 4 may be applied to antenna 164 and production casing 165 described with reference to FIGS. 1A and 1B. For example, antenna 405-*a* may include multiple antenna segments 410-*a* coupled to the member 415-*a* (e.g., a production casing) and may support wireless power transfer and/or wirelessly receiving signals.

Aspects of antenna 405-*b* (and antenna segments 410-*b*) and member 415-*b* described with reference to FIG. 4 may be applied to antenna 174 and production tubing 175 described with reference to FIGS. 1A and 1B. For example, antenna 405-*b* may include multiple antenna segments 410-*b* coupled to the member 415-*b* (tubular member) and may support wireless power transfer and/or wirelessly transmitting signals. In the example embodiment illustrated at FIG. 4, member 415-*a* (tubular member) is illustrated as partially transparent such that antenna 405-*b*, antenna segments 410-*b*, and member 415-*b* (tubular member) are visible. Antenna segments 410-*a* and antenna segments 410-*b* may also be referred to as antenna wire segments.

In some aspects, the antenna moment/directional magnetic field of each antenna segment 410-*a* may intersect an axial direction (e.g., Z-direction) of the member 415-*a*, an axial direction (e.g., Z-direction) of the member 415-*b*, or both. That is, for example, the antenna moment/directional magnetic field of each antenna segment 410-*a* may not be parallel with the axial direction of the member 415-*a*, the axial direction of the member 415-*b*, or both.

In some aspects, the antenna moment/directional magnetic field of each antenna segment 410-*b* may intersect the axial direction of the member 415-*a*, the axial direction of the member 415-*b*, or both. That is, for example, the antenna moment/directional magnetic field of each antenna segment 410-*b* may not be parallel with the axial direction of the member 415-*a*, the axial direction of the member 415-*b*, or both.

In some aspects, one or more antenna segments 410-*a* may at least partially overlap one or more antenna segments 410-*b* in a radial plane associated with the member 415-*a*, the member 415-*b*, or both.

In an example embodiment described with reference to FIG. 4, antenna 405-*a* is a radial directional Rx antenna implemented as a 6-segment saddle coil (e.g., including six antenna segments 410-*a*), positioned outside the member 415-*a*. Each segment 410-*a* of the saddle coil has multi-turns. In the example of FIG. 4, each antenna segment 410-*a* includes three turns, but is not limited thereto. In the example of FIG. 4, the member 415-*a* is a metal casing having an outer diameter of 11", but is not limited thereto. In an example embodiment described with reference to FIG. 4, antenna 405-*b* is a two-segment, multi-turn, saddle coil on member 415-*b* (tubular member) as described with reference to the antenna 305-*a* of FIG. 3A or the antenna 305-*b* of 3B.

In some aspects, the antenna 405-*a* may be implemented without a gap between each antenna segment 410-*a* and member 415-*a* (e.g., a production casing). For example, each antenna segment 410-*a* may be insulated but directly on top of member 415-*a*. The magnetic field generated by antenna 405-*b* is implemented to penetrate the member 415-*a*. Additionally, or alternatively, the antenna 405-*a* may be implemented with a metal cover (or a non-metal cover) that covers at least a portion of each antenna segment 410-*a*.

According to one or more embodiments of the present disclosure, with reference to antenna assembly 400, the coverage of each antenna segment 410-*a* (Rx coil segments) of the antenna 405-*a* is close to an antenna segment 410-*b* (Tx coil segments) of the antenna 405-*b*, which maximizes the efficiency associated with transmitting and receiving signals, with a reduced amount of metal under the antenna segments 410-*a*.

In some embodiments, the antenna segments 410-*a* (Rx coil segments) may be in parallel with a rectifier in a receiver circuit (not illustrated). In such an example, the configuration may effectively remove the azimuthal alignment as a factor capable of affecting the system efficiency. In some aspects, for example, the effective Rx current existing on the effective antenna segments 410-*a* (RX coil segments) causes less coil resistance in the receiver circuit.

Regarding the effective metal load, the eddy current flows at the effective antenna segments 410-*a* (RX coil segments) will be localized and against the Tx current direction at the antenna segments 410-*b* (TX coil segments). The effective metal load is the union of the section under antenna segments 410-*b* (TX coil segments) and under antenna segments 410-*a* (RX coil segments). In some aspects, the antenna segments 410-*b* (TX coil segments) are determining of the effective metal load because the field is established by the antenna segments 410-*b* (TX coil segments). The alignment of the antenna segments 410-*a* (RX coil segments) and the antenna segments 410-*b* (TX coil segments) in accordance with one or more embodiments of the present disclosure support increased efficiency (e.g., improved field reception and reduced metal load) compared to other antenna approaches such as, for example, axial coil coupling.

In some aspects, the effective metal load is concentrated near the antenna 405-*b* instead of equally occupying the full circumference of the member 415-*b* (casing wall). That is, the effective metal load is concentrated at areas of the member 415-*b* which overlap the antenna segments 410-*b*.

Accordingly, for example, the total impedance (Rx impedance) associated with the antenna segments 410-*a*, due to a decreased wire resistance and decreased effective metal loads as described herein, is much smaller than an equivalent Z-direction coil implemented according to some other approaches. For example, some other approaches may implement a Z-direction coil wrapped multiple times around the entire circumference of the member 415-*a*, which results in increased amounts of antenna wire (e.g., hundreds of feet) and increased metal load of the entire casing section.

Aspects of the present disclosure support other lengths (e.g., in the Z-direction) of the antenna segments 410-*a* (RX coil segments). For example, to tolerate potential axial misalignment during installation of the antenna segments 410-*a* and antenna segments 410-*b*, aspects of the present disclosure support elongating one or more antenna segments 410 (e.g., antenna segments 410-*b*) in the Z-direction (axial direction) to, for example, a length of 24 inches. The wire resistance is indeed from the antenna segments 410-*a* (RX coil segments), but in some cases, the metal load may be mainly associated with the size of the antenna segments 410-*b* (TX coil segments).

In an example installation process associated with the borehole string 140, the installation process may include installing member 415-*a* (e.g., a casing coil), followed by installing member 415-*b* (e.g., a tubing coil assembly), which, in some cases, may have a vertical misalignment with the member 415-*a*. Accordingly, for example, elongation of the antenna segments 410-*b* in the Z-direction as supported by aspects of the present disclosure may serve to improve field reception and reduce effective metal load.

The size ranges of the antenna segments 410-*b* may support maintaining efficiency of the system (e.g., antenna assembly 400) for cases of misalignment. That is, for example, aspects of the present disclosure support adjusting the lengths of the antenna segments 410-*b* in the Z-direction in association with achieving one or more target properties (e.g., field reception, effective metal load, or the like) for the antenna 405-*a*. Accordingly, for example, when the lengths of the antenna segments 410-*b* in the Z-direction satisfy a defined threshold length (expressed another way, when Tx is within a certain axial range), the efficiency of the system is not affected by instances of misalignment between the antenna segments 410-*b* (TX coil segments) and the antenna segments 410-*a* (RX coil segments).

Additionally, or alternatively, in some cases, during optimization of the Tx and Rx coupling efficiency (e.g., coupling efficiency between the antenna segments 410-*a* of antenna 405-*a* and the antenna segments 410-*b* of antenna 405-*b*), aspects of the present disclosure support implementing an overlapped coil design for the antenna segments 410-*b* (TX coil segments) as described with reference to the example illustrated at FIG. 2B. For example, in some embodiments, the antenna segments 410-*b* (TX coil segments) may partially overlap as described with reference to FIG. 2B.

In some embodiments, the core for each of the antenna 405-*a* and antenna 405-*b* may be formed of laminated silicon, iron, or ferrite. In some embodiments, resonant tuning, either in parallel or in series, may be applied to each of the antenna segments 410-*a* and each of the antenna segments 410-*b* to increase the coupling efficiency. In some cases, the resonant tuning to each coupled coil can reach up to 90% energy transfer efficiency over the air gap between coils (e.g., between an antenna segment 410-*a* associated with the member 415-*a* and an antenna segment 410-*b* associated with the member 415-*b*). As described and illustrated herein, in some embodiments, the core (not illustrated) of antenna 405-*a* may be concentric around the member 415-*a* (e.g., a production casing) but outside the antenna segment 410-*a*, and the core (not illustrated) of antenna 405-*b* may be concentric around the member 415-*b* (e.g., a production tubing) and inside the antenna segment 410-*b*.

In accordance with one or more embodiments of the present disclosure, for the antenna segments 410-*a* (RX coil segments), material having a relatively high magnetic permeability may be disposed outside of the antenna segments 410-*a* (e.g., in the X-direction or Y-direction, that is, radially outward) for confining magnetic field radiation. In some aspects, material having a relatively high magnetic permeability may be disposed under the antenna segments 410-*b* (TX coil segments), which may enhance the antenna moment and electrical performance.

Aspects of the antenna assemblies described herein (e.g., antenna assembly 160, antenna assemblies 200, antenna assemblies 300, antenna assembly 400) provide improvements over other antenna assemblies and communications systems.

For example, the antenna assemblies described herein incorporate radial directional antennas and electromagnetic coupling for transmitting and receiving signals and power in association with downhole applications, differing from other techniques. The radial directional coupling provides increased efficiency due to the reduced coil impedance achieved through a reduced quantity of ineffective wires at each antenna segment (e.g., antenna segment 410-*a*, antenna segment 410-*b*) of an antenna. Aspects of the antenna segments support a reduced effective metal load per the eddy current flows.

In some aspects, the radial directional coupling supported by the antenna assemblies described herein is not impacted by azimuthal alignment as a factor capable of affecting the system efficiency. For example, because the antenna segments 410-*a* (RX coil segments) are in parallel, and the total field out of the antenna segments 410-*b* (TX coil segments) are captured.

For example, aspects of the antenna assemblies include elongating the receiver segments (e.g., antenna segments 410-*a*), which addresses axial misalignment as described herein with a marginal reduction in power coupling efficiency. For example, the targeted elongation of the antenna segments 410-*a* (RX coil segments) supports addressing and correcting vertical misalignment issues (e.g., in the Z-direction) with the antenna segments 410-*b* (TX coil segments), with increased effectiveness by the wiring of the antenna segments 410-*a* (RX coil segments) and reduced metal loads.

The antenna assemblies described herein support a modular design. For example, during the mechanical and electrical design phase, the modular design of the radial direction antennas supports adaptively scaling the system up or down according to different sizes of casing (e.g., member 415-*a*) and/or production tubing (e.g., member 415-*b*) by adding or removing antenna segments (e.g., antenna segments 410-*a*, antenna segments 410-*b*).

In some embodiments, the antenna segments (e.g., antenna segments 210, antenna segments 410-*a*, antenna segments 410-*b*, and the like) described herein may be implemented as slip-ons configured to clamp onto a non-magnetic casing or tubing joint at, for example, casing (e.g., production casing 165, member 415-*a*) and/or production tubing (e.g., production tubing 175, member 415-*b*), which may dramatically reduce system cost.

According to one or more embodiments of the present disclosure, aspects of a fastening assembly are described with reference to FIGS. 5A through 5C that support features for fastening or clamping antenna segments of an antenna described herein to a casing (e.g., production casing 165, member 415-*a*) and/or production tubing (e.g., production tubing 175, member 415-*b*).

Figure 5A:
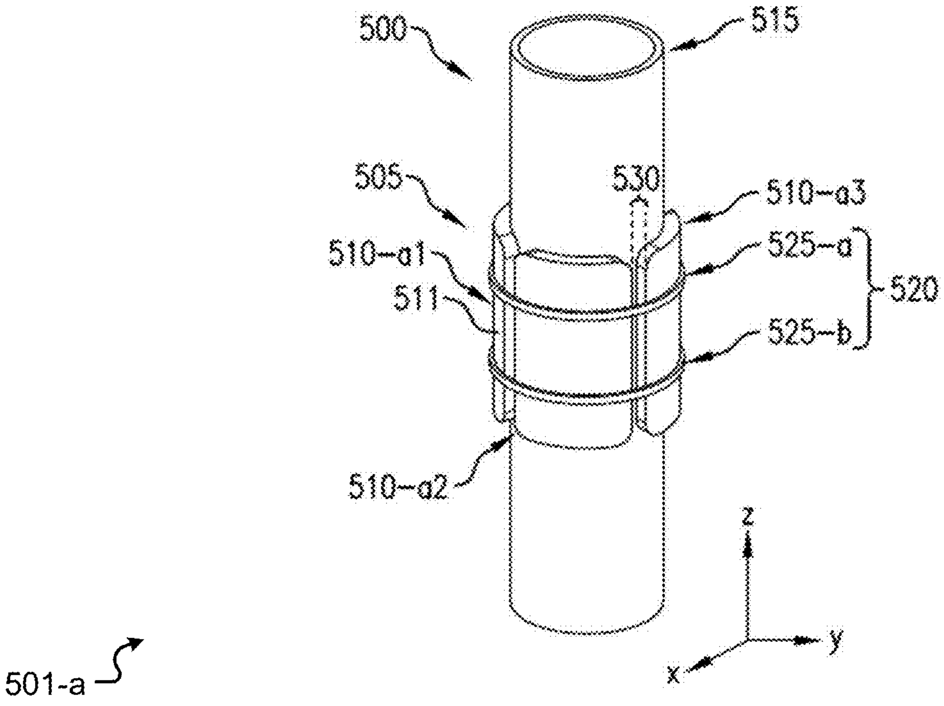
FIGS. 5A through 5C are diagrams illustrating an antenna assembly in accordance with one or more embodiments of the present disclosure.
Figure 5B:
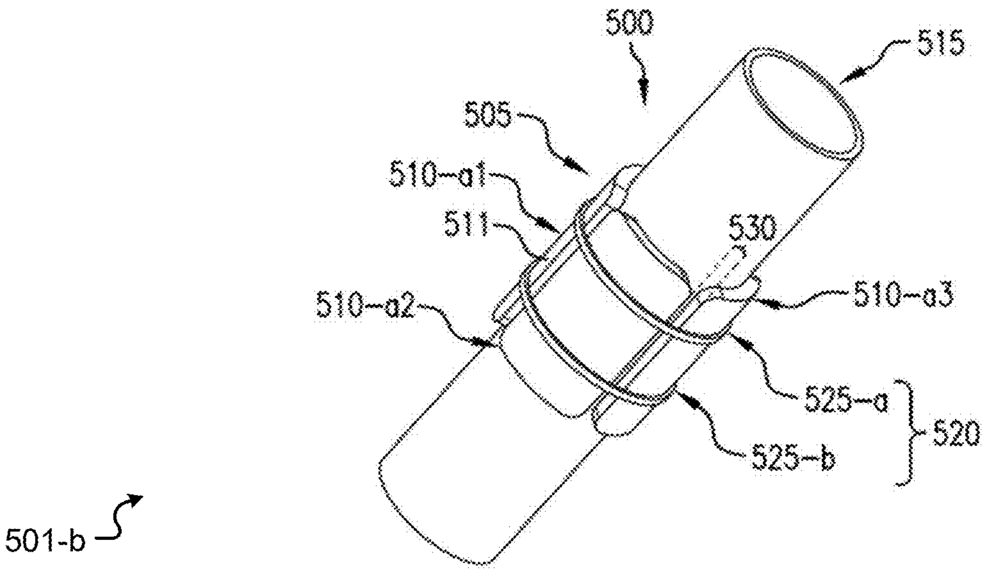
Figure 5C:
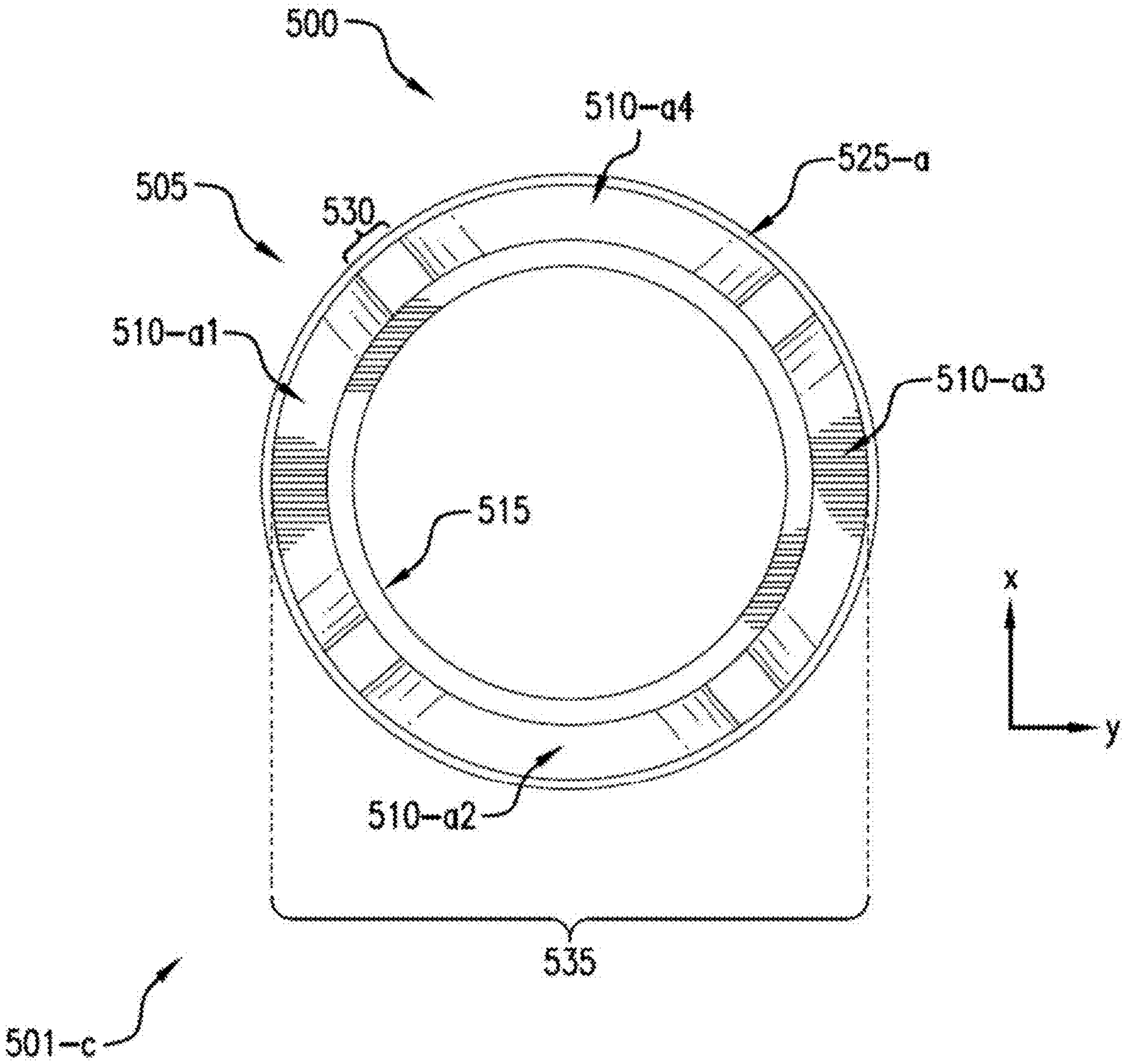

FIGS. 5A through 5C are diagrams illustrating different views 501-*a* through 501-*c* of an antenna assembly 500 in accordance with one or more embodiments of the present disclosure. Aspects of the antenna assembly 500 and components included in the antenna assembly 500 may include aspects of an antenna assembly (e.g., antenna assembly 160, antenna assemblies 200, antenna assemblies 300, antenna assembly 400) described herein, and repeated descriptions of like elements are omitted for brevity.

Referring to FIGS. 5A through 5C, the antenna assembly 500 includes an antenna 505. The antenna 505 may be a radial directional antenna that is concentric with a member 515. The member 515 may be a casing (e.g., production casing 165, member 415-*a*) or production tubing (e.g., production tubing 175, member 415-*b*) described herein.

The antenna 505 may include one or more antenna segments 510. In the example embodiment illustrated at FIGS. 5A through 5C, the antenna 505 includes antenna segment 510-*a*1, antenna segment 510-*a*2, antenna segment 510-*a*3, and antenna segment 510-*a*4, but is not limited thereto.

In an example, each of the antenna segments 510 is concentric with the member 515 and partially extends around a portion of the member 515. For example, each of the antenna segments 510 is concentric with the member 515, without extending around an entirety of the member 515.

In one or more embodiments, each of the antenna segments 510 may be of a configuration as described with reference to any of antenna segments 210 (e.g., antenna segment 210-*a*1, antenna segment 210-*b*1, antenna segment 210-*c*1, and the like), antenna segments 310 (e.g., antenna segment 310-*a*1, and the like), and antenna segments 410 (e.g., antenna segments 410-*a*, antenna segments 410-*b*, and the like) described herein. For example, each of the antenna segments 510 may be formed of housing (or body), magnetic permeable core, antenna wire (not illustrated) (also referred to herein as wiring elements) included in the respective antenna segments 510, and include one or more turns of the antenna wire.

In some embodiments, as illustrated at FIGS. 5A through 5C, each of the antenna segments 510 may include a housing 511 that encapsulates the antenna wire. In some examples, the housing 511 is formed of one or more non-conductive materials. Additionally, or alternatively, the housing 511 may be formed of metal materials. In some other embodiments, (not illustrated), each of the antenna segments 510 may be implemented without the housing 511, such that the antenna segments 510 directly contact the member 515.

The antenna assembly 500 includes a fastening assembly 520 configured to fasten the antenna 505 to the member 515. For example, the fastening assembly 520 may fasten or secure the antenna segments 510 to the member 515.

The fastening assembly 520 may include one or more fastening portions 525 extending around the antenna 505 and around the member 515. In some embodiments, as illustrated at FIGS. 5A through 5C, the fastening assembly 520 may include fastening portion 525-*a* and fastening portion 525-*b*, both extending around the antenna segments 510 and around the member 515. However, aspects of the present disclosure are not limited thereto, and the fastening assembly 520 may include any suitable quantity of fastening portions 525 configured to fasten or secure the antenna 505 (e.g., to fasten or secure antenna segments 510) to the member 515.

In some embodiments, each fastening portion 525 may have a length in the z-direction that is less than respective lengths of the antenna segments 510 in the z-direction. In another example embodiment, (not illustrated), the fastening assembly 520 may include a single fastening portion 525, and the length in the z-direction of the single fastening portion 525 may be greater than respective lengths of fastening portion 525-*a* and fastening portion 525-*b* illustrated at FIGS. 5A through 5C, such that the increased length in the z-direction supports effective fastening or securing the antenna segments 510 to the member 515.

In some embodiments, the fastening portion 525 (e.g., fastening portion 525-*a*, fastening portion 525-*b*) may include a hinge mechanism (not illustrated) supportive of opening and closing the fastening portion 525. For example, the hinge mechanism may support clamping features of the fastening portion 525.

In some additional and/or alternative embodiments, the fastening portion 525 may include a tightening mechanism (not illustrated) supportive of extending or reducing an inner diameter 535 of the fastening portion 525, which may effectively apply pressure or force to the antenna segments 510 (e.g., in the x-direction or y-direction, toward the member 515, for example, a radial direction) in association with fastening or securing the antenna segments 510 to the member 515.

In some additional and/or alternative embodiments, the fastening portion 525 may be a clamping member that may be tightened with a torque force. For example, the fastening portion 525 may be a hose clamp (e.g., worm gear hose clamp, ear hose clamp, quick release hose clamp, a t-bolt hose clamp, a clamp fitted with nut and bolt tightening members, a snap grip hose clamp, a spring hose clamp, a wire hose clamp, a crimp ring hose clamp, or the like).

In some additional and/or alternative embodiments, the fastening portion 525 may be a clamp including location/rotation pin features.

In some embodiments, the fastening portion 525 may be formed of a metallic material, a non-metallic material (e.g., rubber, nylon, or the like), or a combination of metallic and non-metallic materials. In some embodiments, the fastening portion 525 may be temporarily fastened (e.g., releasably fastened) or permanently bonded with antenna segments 510. In some embodiments, the fastening portion 525 may be actually formed as one piece with an antenna segment 510, in which the fastening portion 525 (e.g., hinge, fastener) integrated with the antenna segment 510. For example, the fastening portion 525 may be part of the body or form of the antenna segment 510.

In some aspects, the fastening portion 525 may extend across at least one surface of each of antenna segments 510 and extend around the member 515. In some embodiments, based on the quantity and sizes of the antenna segments 510, a surface of the member 515 may be exposed, and the fastening portion 525 may contact the exposed surface of the member 515. In some other embodiments, based on the quantity and sizes of the antenna segments 510, the fastening portion 525 may not contact surfaces of the member 515.

According to one or more embodiments of the present disclosure, for implementations including multiple antenna segments 510, the antenna 505 may support a gap 530 between adjacent antenna segments 510.

Accordingly, for example, the antenna assembly 500 may support tubular size variations of the member 515 (e.g., tubing having a diameter of 4.5" vs. a diameter of 5.5"). In some aspects, the antenna assembly 500 supports using antenna segments 510 of different sizes and quantities to accommodate a member 515 of a given size, and further, for example, to accommodate target transmission parameters (e.g., transmission frequency, transmission power, transmission type, signal type, and the like) associated with the antenna assembly 500.

In an example in which relatively smaller antenna segments 510 are used, the antenna assembly 500 supports increased flexibility and adaptability through the addition or reduction in the quantity of antenna segments 510 to accommodate large size variations of the member 515 (e.g., a casing having a diameter of 7" vs. a casing having a diameter of 9⅝").

According to one or more embodiments of the present disclosure, the antenna assembly 500 may support achieving curvature tolerances by the design of the antenna segments 510. For example, the antenna assembly 500 may be implemented using antenna segments 510 of any suitable size and/or shape, using any suitable quantity of antenna segments 510, and/or using any suitable material (e.g., a rubbery material, for example, an elastomeric material) for encapsulation in association with achieving target curvature tolerances.

Aspects of the antenna assembly 500 may be implemented for one or both of production tubing (e.g., production tubing 175) (Tx) and production casing (e.g., production casing 165) (Rx).

Set forth below are some embodiments of the foregoing disclosure:

Embodiment 1. An antenna assembly comprising: a first antenna fastened to a first member disposed in a second member, wherein the first member is spaced apart from the second member in a radial direction; and a second antenna fastened to the second member, wherein a direction of an antenna moment associated with the first antenna or the second antenna intersects an axial direction of the first member, an axial direction of the second member, or both.

Embodiment 2. The antenna assembly as in any prior embodiment, wherein the first antenna extends partially around the first member, the second antenna extends partially around the second member, or a combination thereof.

Embodiment 3. The antenna assembly as in any prior embodiment, wherein the first antenna, the second antenna, the first member, and the second member are concentric with the antenna assembly.

Embodiment 4. The antenna assembly as in any prior embodiment, wherein at least one of: the first antenna comprises one or more first antenna segments each partially wrapping around the first member; and the second antenna comprises one or more second antenna segments each partially wrapping around the second member.

Embodiment 5. The antenna assembly as in any prior embodiment, wherein at least one of: a direction of an antenna moments associated with the one or more first antenna segments intersects the axial direction of the first member, the axial direction of the second member, or both; and a direction of second antenna moments associated with the one or more second antenna segments intersects the axial direction of the first member, the axial direction of the second member, or both.

Embodiment 6. The antenna assembly as in any prior embodiment, wherein: the one or more first antenna segments at least partially overlap the one or more second antenna segments in a radial plane associated with the first member, the second member, or both.

Embodiment 7. The antenna assembly as in any prior embodiment, wherein at least one of: a first radial angle of the one or more first antenna segments is less than or equal to 360 degrees; and a second radial angle of the one or more second antenna segments is less than or equal to 360 degrees.

Embodiment 8. The antenna assembly as in any prior embodiment, wherein the one or more first antenna segments, the one or more second antenna segments, or both each comprise: at least two curved wiring elements, wherein each of the at least two curved wiring elements partially wraps around the first member; and at least two wiring elements extending in a first direction of the antenna assembly or a second direction intersecting the first direction, wherein each of the at least two wiring elements is coupled to the at least two curved wiring elements.

Embodiment 9. The antenna assembly as in any prior embodiment, wherein the one or more first antenna segments, the one or more second antenna segments, or both each comprise at least one curved wiring element, wherein: the at least one curved wiring element of the one or more first antenna segments at least partially wraps around the first member; and the at least one curved wiring element of the one or more second antenna segments at least partially wraps around the second member.

Embodiment 10. The antenna assembly as in any prior embodiment, wherein at least one of: each of the one or more first antenna segments comprises a coil including one or more turns; and each of the one or more second antenna segments comprises a coil including one or more turns.

Embodiment 11. The antenna assembly as in any prior embodiment, wherein the one or more first antenna segments are of a different size compared to the one or more second antenna segments.

Embodiment 12. The antenna assembly as in any prior embodiment, wherein at least one of: the one or more first antenna segments are encapsulated by one or more non-conductive materials, one or more conductive materials, or both; and the one or more second antenna segments are encapsulated by the one or more non-conductive materials, the one or more conductive materials, or both.

Embodiment 13. The antenna assembly as in any prior embodiment, wherein: the one or more first antenna segments are directly fastened or indirectly fastened to the first member; and the one or more second antenna segments are directly fastened to or indirectly fastened to the second member.

Embodiment 14. The antenna assembly as in any prior embodiment, wherein at least one of: the first antenna comprises a first antenna segment and a second antenna segment, wherein the first antenna segment at least partially overlaps the second antenna segment; and the second antenna comprises a third antenna segment and a fourth antenna segment, wherein the third antenna segment at least partially overlaps the fourth antenna segment.

Embodiment 15. The antenna assembly as in any prior embodiment, wherein at least one of: the first antenna comprises a first antenna segment and a second antenna segment, wherein the first antenna segment is non-overlapping with the second antenna segment; and the second antenna comprises a third antenna segment and a fourth antenna segment, wherein the third antenna segment is non-overlapping with the fourth antenna segment.

Embodiment 16. The antenna assembly as in any prior embodiment, wherein at least one of: the first antenna comprises a first antenna segment of a first radial angle and a second antenna segment of a second radial angle, wherein: the first radial angle is different from the second radial angle; or the first radial angle is equal to the second radial angle; and the second antenna comprises a third antenna segment of a third radial angle and a fourth antenna segment of a fourth radial angle, wherein: the third radial angle is different from the fourth radial angle; or the third radial angle is equal to the fourth radial angle.

Embodiment 17. An antenna comprising: one or more antenna segments each partially wrapped around and releasably fastened to a member disposed in a borehole, wherein: a direction of an antenna moment associated with the one or more antenna segments intersects an axial direction of the member, and the member comprises a tubular member or a tubular casing outside the tubular member.

Embodiment 18. The antenna as in any prior embodiment, wherein a radial angle of each of the one or more antenna segments is equal to or less than 360 degrees.

Embodiment 19. A communication system comprising: a first member disposed in a borehole; a second member disposed in the borehole, wherein the first member is disposed in the second member and is spaced apart from the second member in a radial direction; an antenna assembly comprising: a first antenna fastened to the first member; and a second antenna fastened to the second member, wherein: the first antenna or the second antenna is configured to generate an electromagnetic field associated with delivering power and providing communication between the first antenna and the second antenna, and a direction of an antenna moment associated with the first antenna or the second antenna intersects an axial direction of the first member, an axial direction of the second member, or both.

Embodiment 20. The communication system as in any prior embodiment, wherein the first antenna extends partially around the first member, the second antenna extends partially around the second member, or a combination thereof.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of +8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An antenna assembly comprising:

a first antenna fastened to a first member disposed in a second member, wherein the first member is spaced apart from the second member in a radial direction; and a second antenna fastened to the second member, wherein:

the first antenna comprises one or more first antenna segments each partially wrapping around the first member, without fully wrapping around the first member, the second antenna comprises one or more second antenna segments each partially wrapping around the second member, without fully wrapping around the second member, a direction of an antenna moment associated with the first antenna intersects an axial direction of the first member, an axial direction of the second member, or both; and a direction of an antenna moment associated with the second antenna intersects the axial direction of the first member, the axial direction of the second member, or both.

2. The antenna assembly of claim 1, further comprising:

a monitoring gauge which is disposed on the second member and electrically coupled to the second antenna, wherein:

the second antenna is configured to wirelessly receive power from the first antenna and provide at least a portion of the received power to the monitoring gauge in association with powering the monitoring gauge;

the monitoring gauge is configured to provide measurement data associated with an annulus between the second member and a third member which is outside the second member; and the second antenna is configured to provide data signals representative of the measurement data to the first antenna.

3. The antenna assembly of claim 1, wherein:

the first antenna, the second antenna, the first member, and the second member are concentric with the antenna assembly, the first member is a tubular member, and the second member is a tubular casing outside the tubular member.

4. The antenna assembly of claim 2, wherein at least one of:

the first antenna comprises an inner surface facing toward a first center axis of the first member, wherein a distance between the inner surface of the first antenna and the first center axis is greater than or equal to a distance between an outer surface of the first member and the first center axis; and the second antenna comprises an inner surface facing toward a second center axis of the second member, wherein a distance between the inner surface of the second antenna and the second center axis is greater than or equal to a distance between an outer surface of the second member and the second center axis.

5. The antenna assembly of claim 1, wherein at least one of:

a direction of an antenna moments associated with the one or more first antenna segments intersects the axial direction of the first member, the axial direction of the second member, or both; and a direction of second antenna moments associated with the one or more second antenna segments intersects the axial direction of the first member, the axial direction of the second member, or both.

6. The antenna assembly of claim 1, wherein:

the one or more first antenna segments at least partially overlap the one or more second antenna segments in a radial plane associated with the first member, the second member, or both.

7. The antenna assembly of claim 1, wherein at least one of:

a first radial angle of the one or more first antenna segments is less than or equal to 360 degrees; and a second radial angle of the one or more second antenna segments is less than or equal to 360 degrees.

8. The antenna assembly of claim 1, wherein the one or more first antenna segments, the one or more second antenna segments, or both each comprise:

at least two curved wiring elements, wherein each of the at least two curved wiring elements partially wraps around the first member; and at least two wiring elements extending in a first direction of the antenna assembly or a second direction intersecting the first direction, wherein each of the at least two wiring elements is coupled to the at least two curved wiring elements.

9. The antenna assembly of claim 1, wherein the one or more first antenna segments, the one or more second antenna segments, or both each comprise at least one curved wiring element, wherein:

the at least one curved wiring element of the one or more first antenna segments at least partially wraps around the first member; and the at least one curved wiring element of the one or more second antenna segments at least partially wraps around the second member.

10. The antenna assembly of claim 1, wherein at least one of:

each of the one or more first antenna segments comprises a coil including one or more turns; and each of the one or more second antenna segments comprises a coil including one or more turns.

11. The antenna assembly of claim 1, wherein the one or more first antenna segments are of a different size compared to the one or more second antenna segments.

12. The antenna assembly of claim 1, wherein at least one of:

the one or more first antenna segments are encapsulated by one or more non-conductive materials, one or more conductive materials, or both; and the one or more second antenna segments are encapsulated by the one or more non-conductive materials, the one or more conductive materials, or both.

13. The antenna assembly of claim 1, wherein:

the one or more first antenna segments are directly fastened or indirectly fastened to the first member; and the one or more second antenna segments are directly fastened to or indirectly fastened to the second member.

14. The antenna assembly of claim 1, wherein at least one of:

the first antenna comprises a first antenna segment and a second antenna segment, wherein the first antenna segment at least partially overlaps the second antenna segment; and the second antenna comprises a third antenna segment and a fourth antenna segment, wherein the third antenna segment at least partially overlaps the fourth antenna segment.

15. The antenna assembly of claim 1, wherein at least one of:

the first antenna comprises a first antenna segment and a second antenna segment, wherein the first antenna segment is non-overlapping with the second antenna segment; and the second antenna comprises a third antenna segment and a fourth antenna segment, wherein the third antenna segment is non-overlapping with the fourth antenna segment.

16. The antenna assembly of claim 1, wherein at least one of:

the first antenna comprises a first antenna segment of a first radial angle and a second antenna segment of a second radial angle, wherein:

the first radial angle is different from the second radial angle; or the first radial angle is equal to the second radial angle; and the second antenna comprises a third antenna segment of a third radial angle and a fourth antenna segment of a fourth radial angle, wherein:

the third radial angle is different from the fourth radial angle; or the third radial angle is equal to the fourth radial angle.

17. An antenna comprising:

one or more antenna segments each partially wrapped around and releasably fastened to a member disposed in a borehole, without fully wrapping around the member, wherein:

the member surrounds a second member disposed in the borehole and is spaced apart from the second member in a radial direction, a direction of an antenna moment associated with the one or more antenna segments intersects an axial direction of the member, an axial direction of the second member, or both, and the antenna is configured to at least one of:

wirelessly receive power from a second antenna which is fastened to the second member and provide data signals representative of measurement data to the second antenna, or wirelessly transmit second power to the second antenna and receive data signals representative of second measurement data from the second antenna.

18. The antenna of claim 17, wherein a radial angle of each of the one or more antenna segments is equal to or less than 360 degrees.

19. A communication system comprising:

a first member disposed in a borehole;

a second member disposed in the borehole, wherein the first member is disposed in the second member and is spaced apart from the second member in a radial direction;

an antenna assembly comprising:

a first antenna fastened to the first member, wherein the first antenna comprises one or more first antenna segments each partially wrapping around the first member, without fully wrapping around the first member; and a second antenna fastened to the second member, wherein the second antenna comprises one or more second antenna segments each partially wrapping around the second member, without fully wrapping around the second member, wherein:

the first antenna is configured to generate an electromagnetic field associated with delivering power to the second antenna, the second antenna is configured to provide data signals representative of measurement data to the first antenna, and a direction of an antenna moment associated with the first antenna or the second antenna intersects an axial direction of the first member, an axial direction of the second member, or both.

20. The communication system of claim 19, wherein the first antenna extends partially around the first member, the second antenna extends partially around the second member, or a combination thereof.

* * * * *